United States Patent [19]

McInnes

[11] Patent Number: 5,788,097
[45] Date of Patent: Aug. 4, 1998

[54] TEAT

[76] Inventor: Ross G. McInnes, P.O. Box 115, Waipu 0254, New Zealand

[21] Appl. No.: 669,571

[22] PCT Filed: Feb. 9, 1995

[86] PCT No.: PCT/NZ95/00011
§ 371 Date: Aug. 13, 1996
§ 102(e) Date: Aug. 13, 1996

[87] PCT Pub. No.: WO95/21523
PCT Pub. Date: Aug. 17, 1995

Related U.S. Application Data

[63] Continuation-in-part of Ser. No. 381,950, Feb. 13, 1995, Pat. No. 5,598,809.

[30] Foreign Application Priority Data

Feb. 14, 1994 [NZ] New Zealand ............ 250873

[51] Int. Cl.$^6$ ........................................ A61J 11/00
[52] U.S. Cl. ................... 215/11.1; 215/11.4; 119/71
[58] Field of Search ............................ 215/11.1, 11.4

[56] References Cited

U.S. PATENT DOCUMENTS

| | | | |
|---|---|---|---|
| 131,130 | 9/1872 | Stevenson | 215/11.1 |
| 1,683,246 | 9/1928 | Griffiths . | |
| 2,708,421 | 5/1955 | Jauch | 215/11.4 X |
| 3,645,414 | 2/1972 | Barr | 215/11.3 |

FOREIGN PATENT DOCUMENTS

| | | | |
|---|---|---|---|
| 15716 | 2/1935 | Australia | 215/11.1 |
| 0 428 992 | 5/1991 | European Pat. Off. . | |
| 21579 | 1/1909 | United Kingdom | 215/11.1 |
| 219172 | 7/1924 | United Kingdom | 215/11.1 |
| 2199310 | 7/1988 | United Kingdom | 215/11.1 |
| 2215318 | 9/1989 | United Kingdom | 215/11.1 |
| WO 85/02323 | 6/1985 | WIPO . | |
| WO 94/04023 | 3/1994 | WIPO . | |

*Primary Examiner*—Sue A. Weaver
*Attorney, Agent, or Firm*—Evenson, McKeown, Edwards & Lenahan P.L.L.C.

[57] ABSTRACT

A teat for feeding liquids to animals has a fastening member enabling the teat to be fastened to a source of liquid such as pipe or drum in use to project outwardly from the source. The teat is resilient having an outer end which is closed apart from a slit in it which slit is itself normally adapted to be closed to provide a liquid seal. The closed outer end is preferably concave, coned, cusped or otherwise reentrant. Integral reinforcing members such as webs are located internally on either side of the slit so that if the end of the teat is squashed or compressed by sucking forces exerted by the animal with components along the direction of slit, the reinforcing member causes the slit to be stretched open, thereby allowing liquid to flow out of it in use. The pulling or stretching action allows an acceptable flow rate from a comparatively small slit which is less prone to tear than a large slit. Also a wall-stiffening web is provided, preferably as transverse web integral with the reinforcing members webs, extending from at or near the slit towards the inlet end of the teat, to provide internal stiffening, and acting in conjunction with the resilients to hold the slit closed when no sucking is occurring.

16 Claims, 2 Drawing Sheets

1

TEAT

BACKGROUND OF THE INVENTION

This is a Continuation-in-Part of Ser. No. 08/381,950, filed Feb. 13, 1995 U.S. Pat. No. 5,598,809.

This invention relates to an improved teat. Where animals are to be artificially reared on milk or other liquids, teats are usually the preferred means of facilitating a young animal to self-feed.

For example, in order to feed numerous calves at one time, there may be a row of teats projecting horizontally around the top perimeter of a container and those teats would normally be connected to tubes equipped with one-way valves to enable liquid to be drawn up from the bottom of the container when the teat is sucked. Obviously in such a construction, as long as the teat level is above the liquid level, there is no danger of appreciable quantities of the liquid leaking out of the teat under gravitational pressure.

However, where the teats are to be gravity fed they may be situated, for example, at the base of a container so that there is a head of liquid above the teats of perhaps up to 2 metres, and it then becomes imperative that the teats be self-sealing and able to resist that amount of pressure.

This invention relates to a modification of the invention described in my PCT Patent Application NZ 93/00065, published as WO 94/04023 on 3 Mar. 1994 now U.S. Pat. No. 5,598,809.

With constant heavy use it has been found that the teats of that invention can tend to flatten as the rubber of which they are made fatigues and when this occurs the teat slit is left slightly open allowing a small amount of leakage.

SUMMARY OF THE INVENTION

The present invention consists in a teat having a wall or walls; having a hollow interior defined by the wall or walls; having an inlet end; having fastening means at the inlet end enabling the teat to be fastened to a source of liquid in use to project outwardly from the source; having an outer end which is closed apart from a slit in it which slit is itself normally adapted to be closed to provide a liquid seal; the teat being made of a resilient material with integral internal reinforcing means on either side of the slit selectively stiffening part of the teat so that if the end of the teat is squashed or compressed by forces with components along the direction of the slit, the reinforcing means stretch the slit open, thereby allowing liquid to flow out of it in use, characterised in that internal wall-stiffening means is provided joining opposite areas of the internal face or faces of the wall or walls, beyond the slit, together to provide internal stiffening tending to hold the slit closed.

The advantage of the present invention is that the previous small slit can be used with still better sealing characteristics while ensuring a high volume of liquid is released through the slit by stretching it open when sucking occurs and maintaining it closed when there is no sucking.

BRIEF DESCRIPTION OF THE DRAWINGS

The preferred form of the present invention will now be described with reference to the accompanying drawings in which.

DESCRIPTION OF THE PREFERRED EMBODIMENTS

Figure 6:
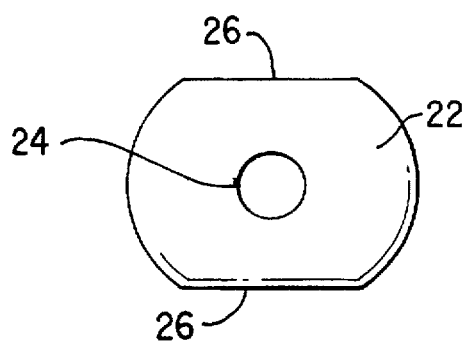
FIG. 6 shows an end view in the direction VI—VI of FIG. 2.

My prior teat is preferably substantially cylindrical, having a hollow interior 1 and the thickness of the wall 2 is thinner at what will be the outer end of the teat in use, compared to the thickness of the inner portion 3 which will abut the liquid source—usually a container. A flange 4 is adapted to lie against the inner surface of the liquid container so that surface 5 will abut the inside wall of the container. The cylindrical surface 6 will pass through a hole in the wall of the container, there being a tight fit at this point, and a locking means, which may be in the form of a circumferential rib 7 of semi-circular, or, as shown, triangular cross-section, is adapted to abut against the outer wall of the container to lock the teat in place. The teat will normally project horizontally, but in some instances the teat may be installed with an upward or downward inclination. Typically the length of the teat would be about 80 mm and the wall thickness near its outer end 9 would be about 2.5 mm.

The teat is made of resilient rubber or other suitable material and the outer end 9 is closed by means of a preferably concave portion 10 which has a slit 11 provided at its centre. The slit would be about 5 to 10 mm long and is not moulded into the teat but is pierced into the teat after moulding. Reinforcing means are preferably provided by means of two integrally moulded webs 12 and 13 and these are preferably co-planar, at right angles to the slit 11, and lie on the same diameter as can be seen from FIG. 4.

In operation when there is a squeezing action exerted on the side walls at the outer end 9 and there are force components aligned with the direction of the slit 11, so that the outer walls are tending to be squashed towards the webs 12 and 13, then the stiffness imparted by the webs, which will then be under tension, will, on such deformation of the end of the teat, stretch or pull the slit open, thus allowing liquid to flow through it. Thus with the typical sucking action of an animal which consists in the animal effectively biting and then releasing the bite on the teat in a rapid series of repetitive movements, the feeding liquid can flow out of the slit whenever the teat is bitten or squeezed, provided that there is a force component along the length of the slit. If, however, the force components are all at right angles to the length of the slit, then there will be no tendency for the slit to open. Usually, since the teats will be installed to project horizontally, or at least at an angle with some horizontal component, the slits will be arranged, as the teats are being inserted into the liquid container, so that each slit is in a vertical or substantially vertical plane. Thus, there is a reasonable likelihood that the sucking action will be in the right direction to cause opening of the slit.

Experimentation has shown that the larger and thicker the webs 12,13, the faster the flow of milk and the better the seal of the slit 11. However, this puts a lot of stress on the end of the teat and the ends of the slit tend to tear after prolonged use. A smaller web of the same thickness (namely 2 mm) has a lesser milkflow but it still puts stress on the end of the teat, although it lasts longer than one with the larger web. The seal is still satisfactory apart from the fatigue problem addressed by the present invention.

A larger, thin web of thickness 0.75 mm, as illustrated, appears to be the best compromise. The milkflow is still adequate and the web is able to stretch before it puts too much stress on the teat. The seal is good, apart from the fatigue problem, and the teat lasts well.

A teat with no internal webs is too slow to release liquid to be of any use unless the slit is made larger, which makes the seal inadequate.

It should be appreciated that the seal of my above-described prior invention is primarily achieved by the resilience of the rubber of the teat, assisted by the inward doming, coning or cusping of the end where such is provided, and secondarily the webs may be of some assistance to stiffen the sides of the slit.

Figure 4:
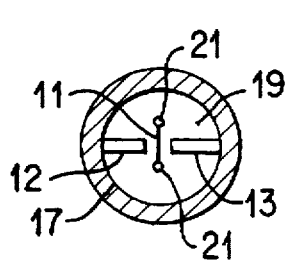
FIG. 4 shows a cross-sectional view on the plane IV—IV of FIG. 2.

The webs 12,13 of my prior construction preferably have an included angle of about 30° where they meet with the internal substantially cylindrical face 17 of the teat and where they meet on the convex inner surface 19 of the closed end 9 of the teat they are spaced about 5 mm apart, as shown in FIG. 4. The preferred radius of curvature of the concave outer end 10 of the teat is about 5 mm.

Figure 1:
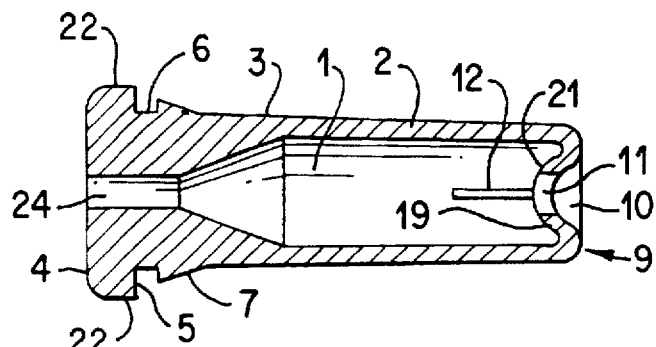
FIG. 1 shows a central longitudinal cross-section of my prior preferred form of teat as shown in my U.S. Pat. No. 5,598,809, the section being aligned with the slit.

To prevent the slit 11 from elongating or tearing it is preferable to mould a small stress-relieving cavity or internal indentation 21 at each end of the slit. The cavities only need to be about 1 mm in diameter and about 75% of the rubber thickness in length as shown in FIGS. 1 and 4. The centre to centre spacing of the cavities is preferably about 6 mm.

The preferred length of my prior teat is about 66 mm overall. The length of the teat projecting beyond the flange 22 is approximately 60 mm. If this length is much greater then it becomes too long for a smaller calf which will tend to gag while feeding. If it is shorter then it becomes too short for an older calf to feed properly.

Figure 5:
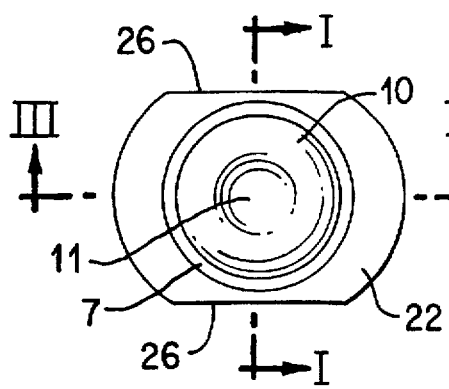
FIG. 5 shows an end view in the direction V—V of FIG. 2.

In order to facilitate placement of the teat into a liquid source from the outside, e.g. where the teat is to be inserted into the side wall of a length of pipe for example, and there is no ready access from the inside, it is preferable for the flange portion 22 to be substantially elliptical with its minor axis aligned with the direction of the slit, or flattened at 26 as illustrated in FIGS. 5 and 6.

Obviously the teats could also be slid over the end of a tube in which case no flange would be needed but the fastening means could conveniently be internal ridges in the bore 24 adapted to grip on external circumferential ridges on the end of the tube.

As illustrated the flange 22 has two flats 26 at right angles to the slit 11. The flats are preferable to an elliptical flange making it still easier to insert the teat into a liquid source from the outside and also where end users install the teats themselves into the liquid source the flats, being at 90° to the slit, may provide an easy means of visual alignment. The slit 11 must be substantially vertical for the teat to work properly when subjected to the normal biting action of a sucking animal. Since the teats will usually be installed at the bottom of the side wall of a container which may have been pressed from stainless steel or moulded from plastics, the lowermost flat 26 prevents the flange from being held proud of the internal wall of the container by the curve which would usually be present between the side walls and the base of the container while yet allowing the teat to be situated as low as possible on the side wall.

Various rubbers have been developed over a long period of time to be suitable for use in a farming environment, e.g. with milking machines and the like. Such rubber compounds are suitable for use with the present invention but obviously there is some choice available and one can select from different hardnesses of rubber, with consequent different sealing capacities and different lifespans. The rubber which has been found to be the most suitable compromise is 50 Shore A natural rubber. The teat is moulded in one piece from the same rubber compound.

Figure 3:
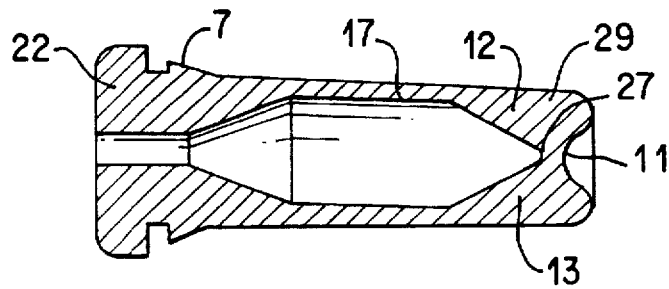
FIG. 3 shows a longitudinal cross-section of the teat of FIG. 1 at right angles to the cross-section of FIG. 1.

It will be appreciated from the above description that the reinforcing means, which are provided by the webs, usually act in tension when the end of the teat is squeezed in the appropriate direction. In effect they serve to grasp the mid-point of the preferably domed end on either side of the slit and to stretch it open because the webs restrain the distortion of the relative spacing between the domed inner end 19 and the side wall 2 of the teat in the plane of the webs. When the teat is subjected to a biting action with a force component along the length of the slit the end of the teat tends to assume an oval shape with the minor axis aligned with the direction of the slit. As the relative spacing of the points such as 27 and 29 (shown on FIG. 3) remains substantially constant (apart from the tendency of the webs to stretch) it can be appreciated that there are opposite forces applied at the sides of the slit 11 through the webs 12,13 which tend to pull the slit open. In such a situation the webs are acting in tension. When there is no biting force on the end of the teat then the webs tend to assume their normal position and may contribute to pushing the edges of the slit closed.

Thus my prior invention allows the use of a much smaller slit than would otherwise be possible for a given rate of flow of liquid out of the slit, facilitating better sealing of the slit when there is no sucking occurring. It will also be appreciated that were it practical to mould a direct link between the points 27 and 29, such as a rod of rubber, this could achieve much the same effect of drawing the slit apart when the end is squeezed together along the direction of the slit. However, webs are easier to mould. There may also be more than just one pair of webs if desired.

While the end of the teat is preferably domed inwardly it can be formed into an inward cone or an inward cusp shape or even a multi-sided shape e.g. in the shape of a hipped or gable roof with the slit running along the ridge or any other suitable re-entrant shape that assists sealing of the slit.

According to my present invention I have found that a wall-stiffening means may advantageously be provided which joins opposite areas of the internal face or faces of the wall or walls, beyond the slit, together to provide internal stiffening tending to hold the slit closed.

There are preferably two internal reinforcing webs which are co-planar on the same diameter at right angles to the slit, the webs being united thus forming a wall-stiffening means 101 in continuity with the webs which extends from the slit towards the inlet end and joins diametrically opposite areas of the internal face of the wall, beyond the slit, together to provide internal stiffening tending to hold the slit closed.

In this arrangement advantage is taken of the ease of moulding the wall-stiffening portion integrated with the previous webs. However, as a portion of the wall-stiffening means 101 bridges the previous gap between the webs adjacent the slit, it needs to be slit for a short distance of about 4–5 mm as the slit is formed to allow the slit 11 to be opened as much as in the prior art construction. The effect is much the same as if the wall-stiffening means had been totally separate from the reinforcing webs with a bottom edge 4–5 mm from the slit. Indeed, with suitable tooling the wall-stiffening means could be moulded in that manner as a band or a rod. It also could also then be provided as two bands or webs, each in a respective plane parallel to, and each flanking, but not coplanar with, the plane of the reinforcing webs of FIG. 4.

As there are many possible configurations of multiple reinforcing webs, most, if not all, can be extended towards each other to link up and perhaps be extended towards the inlet end of the teat thus providing integral multiple wall-stiffening means or webs.

Figure 2:
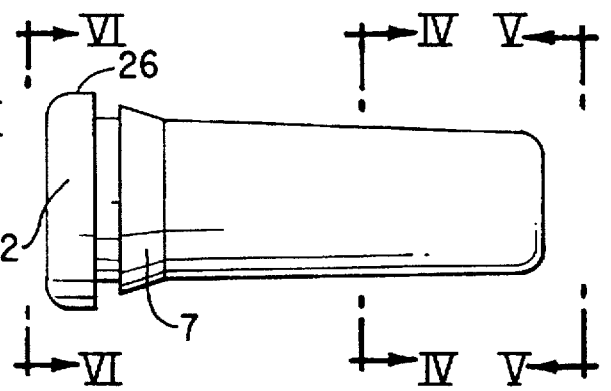
FIG. 2 shows a side elevation of the teat of FIG. 1.
Figure 7:
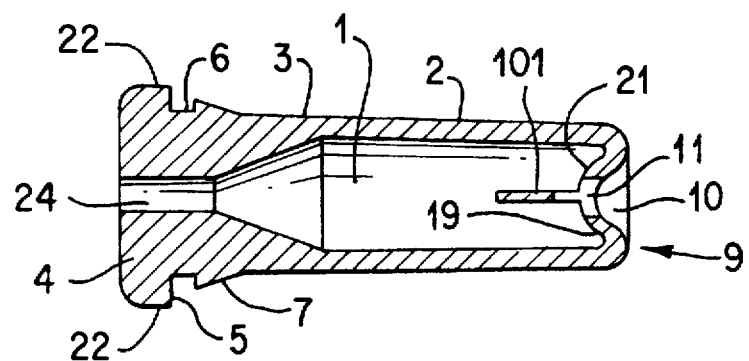
FIG. 7 shows a central longitudinal cross-section of the teat of the present invention showing the modification made to my prior invention, the section being aligned with the slot.
Figure 8:
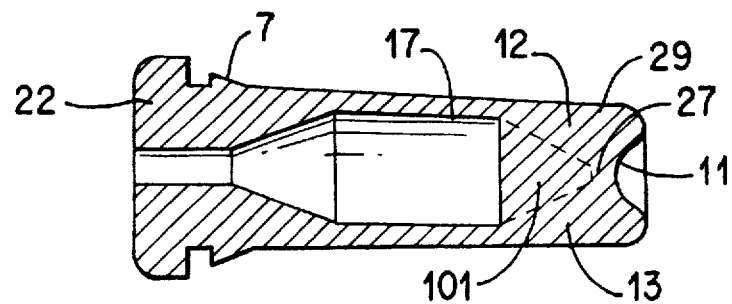
FIG. 8 shows a longitudinal cross-section of the teat of FIG. 7 at right angles to the cross-section of FIG. 7.

The teat shown in FIGS. 7 and 8 is therefore representative of the present invention but many other configurations would be possible but perhaps not so convenient to manufacture. It should be appreciated that the views of the FIGS. 7 and 8 embodiment corresponding to FIGS. 2, 5 and 6 will be identical. As before the portions of the web at the domed end directly adjacent to the slit pull the slit open when sucking produces forces aligned with the slit and the additional integral wall-stiffening web 101 (the additional part being shown in dotted outline) serves to pull back, or hold, the sides of the teat together when sucking has finished, closing the slit tighter than would otherwise be the case after the resilient material of the teat has fatigued.

Thus by a very easy to effect modification to my prior invention I have solved a slight leakage problem in fatigued teats to provide a longer life for my improved teat at negligible cost providing a very significant economic benefit to end users and minimising the material wastage inevitably involved with discarded teats. As teats are used in very considerable volume in every country where there is a dairy industry this invention is of significant economic importance to the dairy industry.

What is claimed is:

1. A teat comprising at least one wall having a hollow interior defined by an internal face of the at least one wall; having an inlet end; having a fastening member at the inlet end enabling the teat to be fastened to a source of liquid in use to project outwardly from the source; having an outer end which is closed apart from a slit in it which slit is itself normally adapted to be closed to provide a liquid seal; the teat being made of a resilient material with an integral internal reinforcing member on either side of the slit selectively stiffening part of the teat so that if the end of the teat is squashed or compressed by forces with components along the direction of the slit, the reinforcing member stretches the slit open, thereby allowing liquid to flow out of it in use; and an internal wall-stiffening portion joining opposite areas of the internal face of the at least one wall, beyond the slit, together to provide internal stiffening tending to hold the slit closed.

2. A teat as claimed in claim 1 wherein the closed outer end is re-entrant in shape.

3. A teat as claimed in claim 2 wherein the closed outer end is concave, coned, or cusped in shape.

4. A teat as claimed in claim 1 or claim 2 wherein said teat has substantially cylindrical inner and outer wall surfaces, and wherein the reinforcing member comprises webs bridging between the inner surface of the outer end portion and the inner substantially cylindrical wall surface.

5. A teat as claimed in claim 4 wherein there are two such webs which are co-planar on the same diameter substantially at right angles to the slit, the webs being united to form the wall-stiffening portion in continuity with the webs and which extends from the slit towards the inlet end and joins diametrically opposite areas of the internal face of the wall, beyond the slit, together.

6. A teat as claimed in claim 5 wherein the slit partially penetrates the wall stiffening portion.

7. A teat as claimed in claim 6 wherein the penetration is about 4 to 5 mm.

8. A teat as claimed in claim 4 wherein there are multiple webs on either side of the slit which are united with at least one wall-stiffening portion.

9. A teat as claimed in claim 1 or 2 wherein the reinforcing member comprises webs and the web walls are about 0.75 mm thick.

10. A teat as claimed in claim 1 or 2 wherein the length of the slit is about 6 mm.

11. A teat as claimed in claim 1 or 2 wherein the slit terminates at an internal indentation or cavity at each end.

12. A teat as claimed in claim 1 or 2 wherein the liquid source is a container and the fastening member comprises a substantially circular flange portion adapted to lie on the inside of the container, in use, a substantially cylindrical portion adapted to pass through a hole in the container, in use, and a locking member adapted to press on the outer wall of the container, in use, to hold the teat in position with the flange against the internal wall of the container.

13. A teat as claimed in claim 12 wherein the locking member comprises a circumferential rib.

14. A teat as claimed in claim 13 wherein the locking member is in the form of an integral circumferential rib of substantially triangular cross-section.

15. A teat as claimed in claim 12, wherein the wall thickness of the teat is thicker at its inlet end which abuts the container, in use.

16. A teat as claimed in claim 12 wherein the substantially circular flange has two opposite flats at its circumference which are aligned substantially at right angles to said slit.

\* \* \* \* \*